Aug. 12, 1941. C. W. AVERY ET AL 2,251,970
VEHICLE BODY
Filed Aug. 1, 1938 6 Sheets-Sheet 1
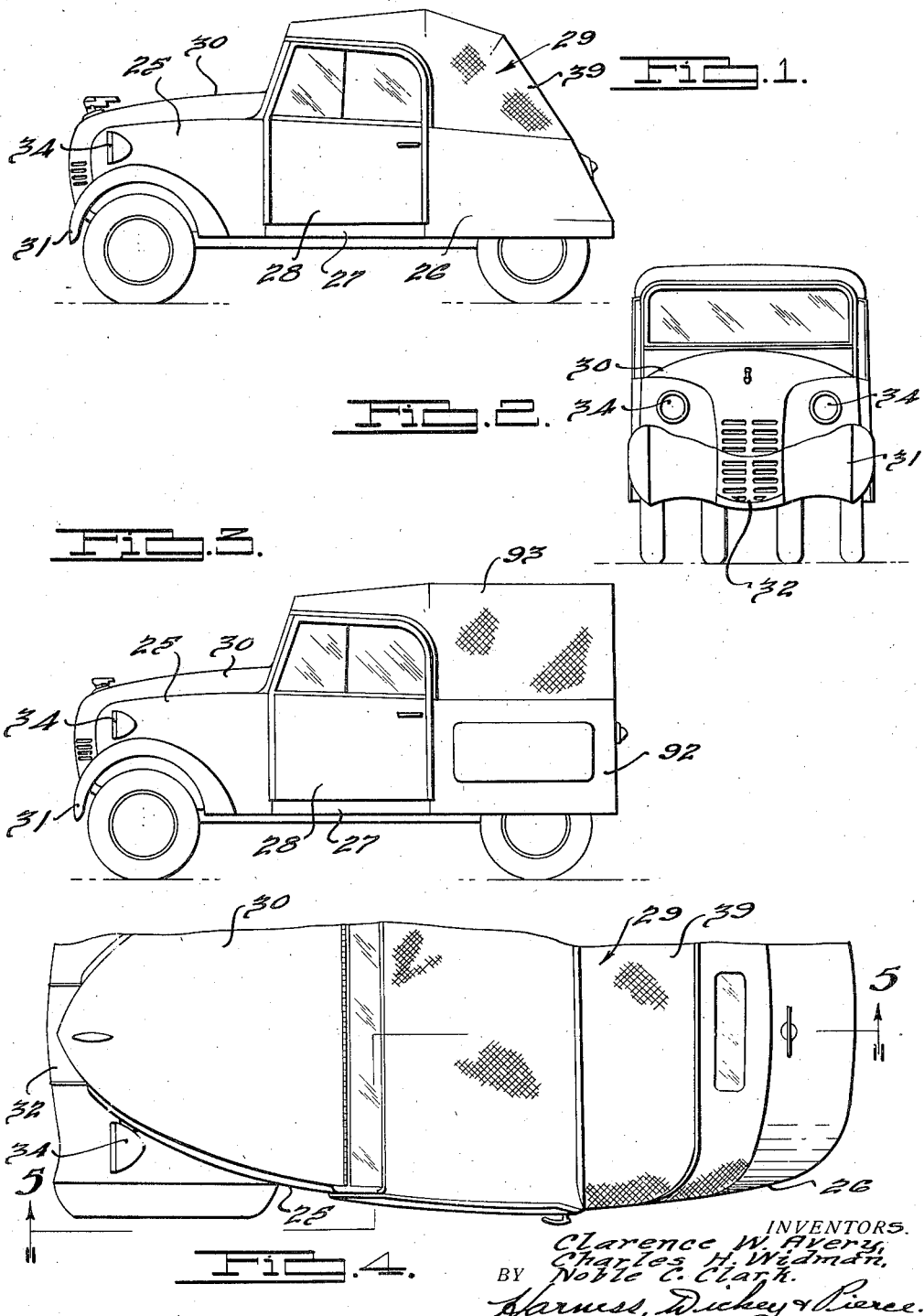
INVENTORS.
Clarence W. Avery,
Charles H. Widman,
BY Noble C. Clark.
Harness, Dickey & Pierce.
ATTORNEYS.

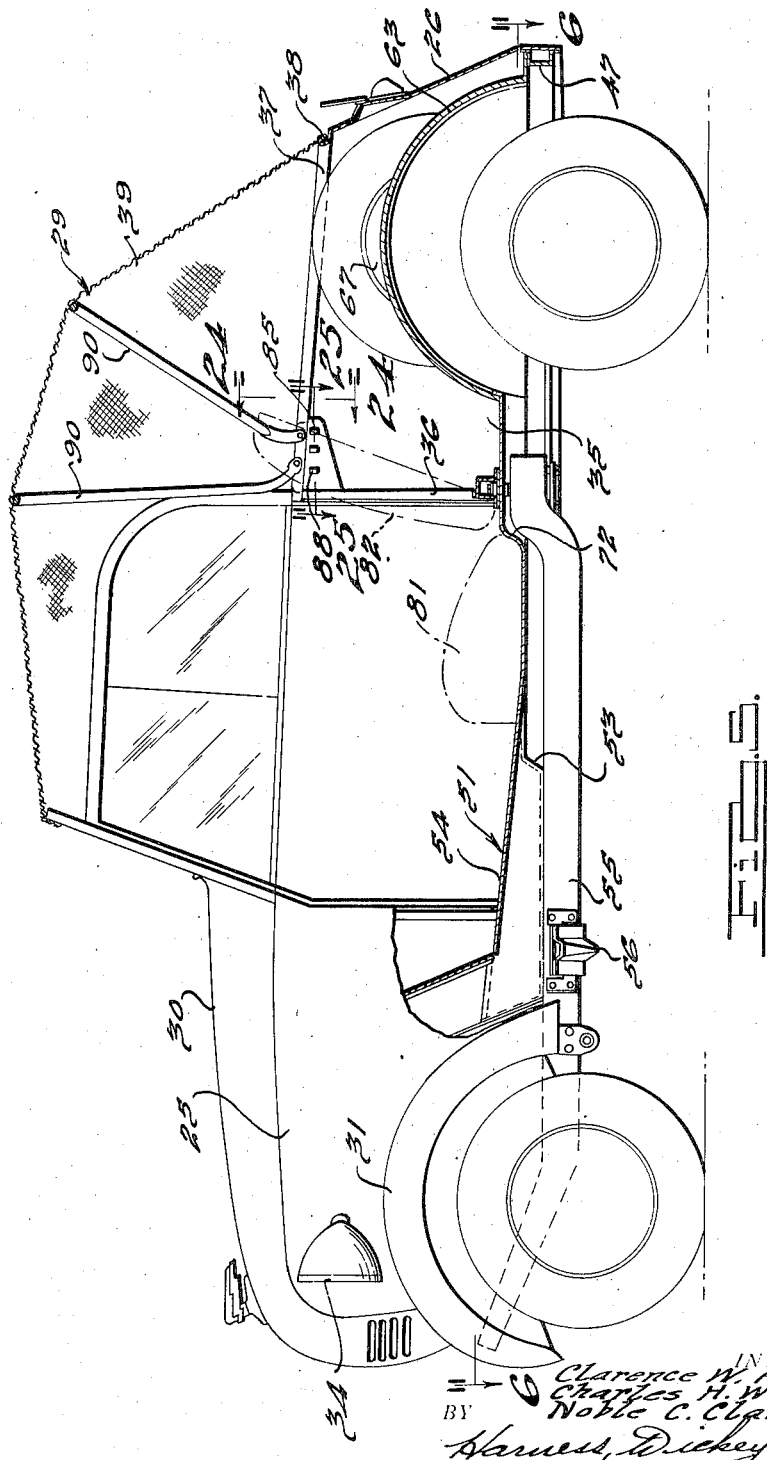

Aug. 12, 1941.   C. W. AVERY ET AL   2,251,970
VEHICLE BODY
Filed Aug. 1, 1938   6 Sheets-Sheet 3
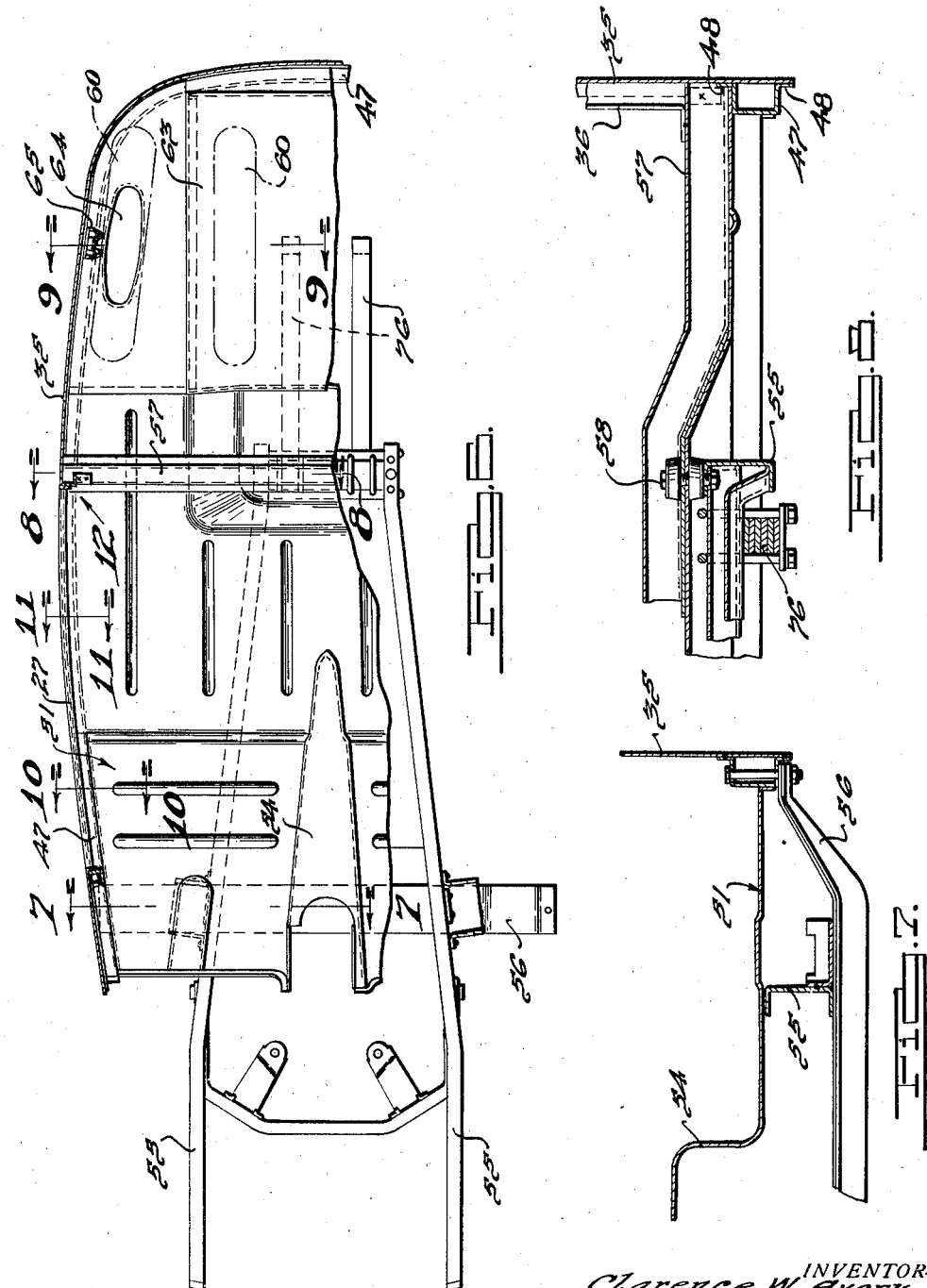
INVENTORS.
Clarence W. Avery,
Charles H. Widman,
BY Noble C. Clark.
Harness, Dickey & Pierce.
ATTORNEYS.

Aug. 12, 1941.　　C. W. AVERY ET AL　　2,251,970
VEHICLE BODY
Filed Aug. 1, 1933　　6 Sheets-Sheet 4
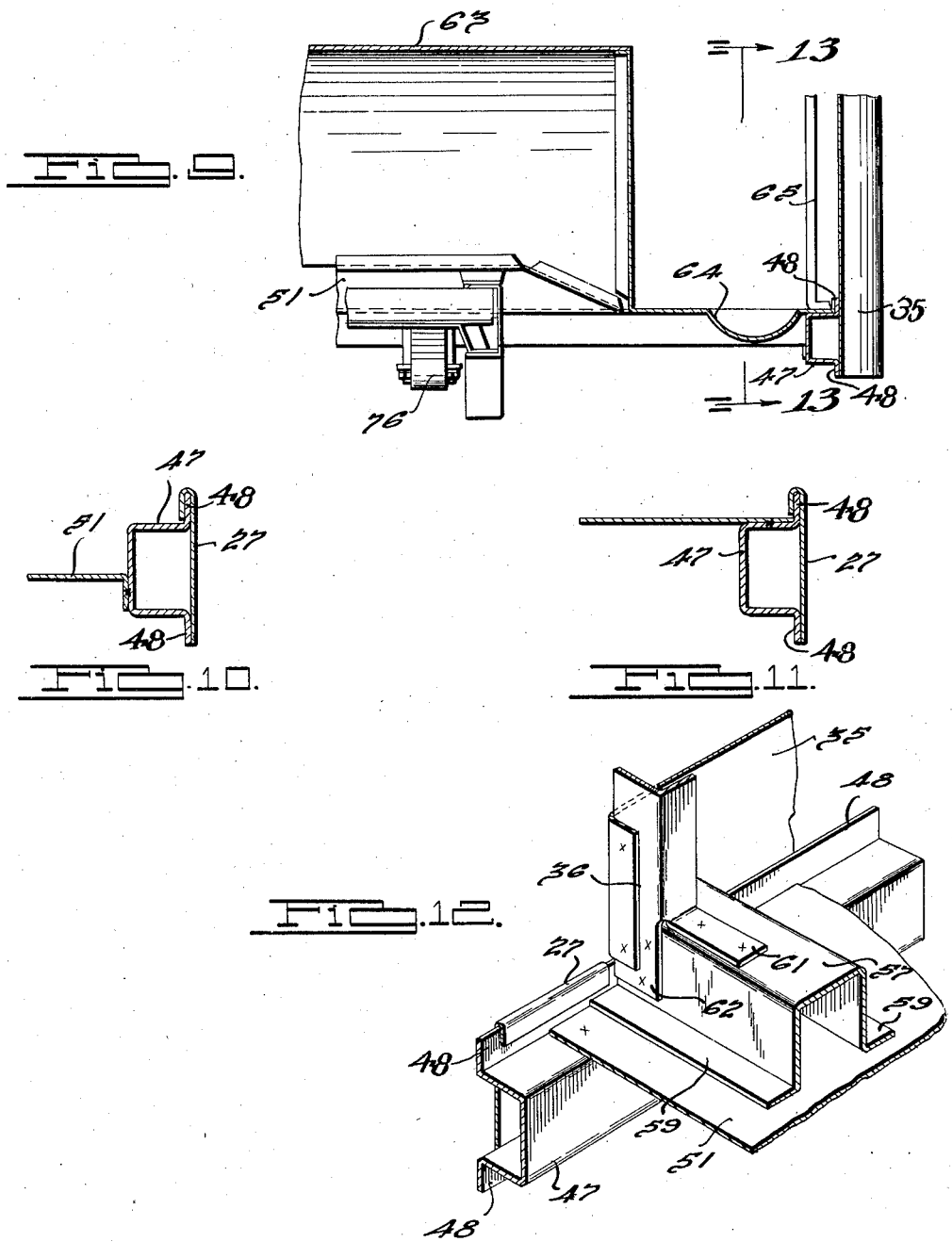

Aug. 12, 1941.  C. W. AVERY ET AL  2,251,970
VEHICLE BODY
Filed Aug. 1, 1938  6 Sheets-Sheet 5
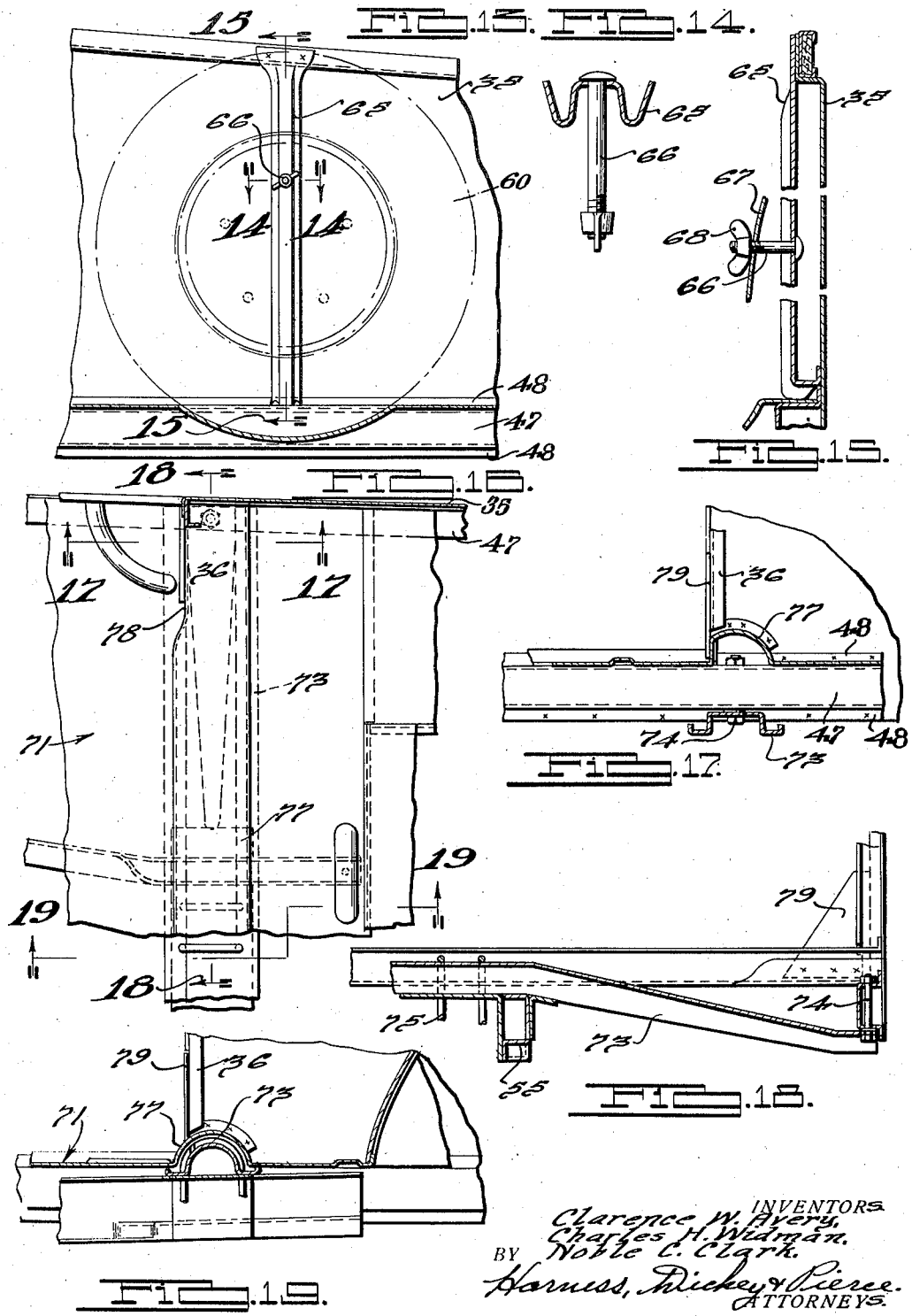
INVENTORS
Clarence W. Avery,
Charles H. Widman,
Noble C. Clark.
BY Harness, Dickey & Pierce.
ATTORNEYS.

Aug. 12, 1941.   C. W. AVERY ET AL   2,251,970
VEHICLE BODY
Filed Aug. 1, 1933   6 Sheets-Sheet 6
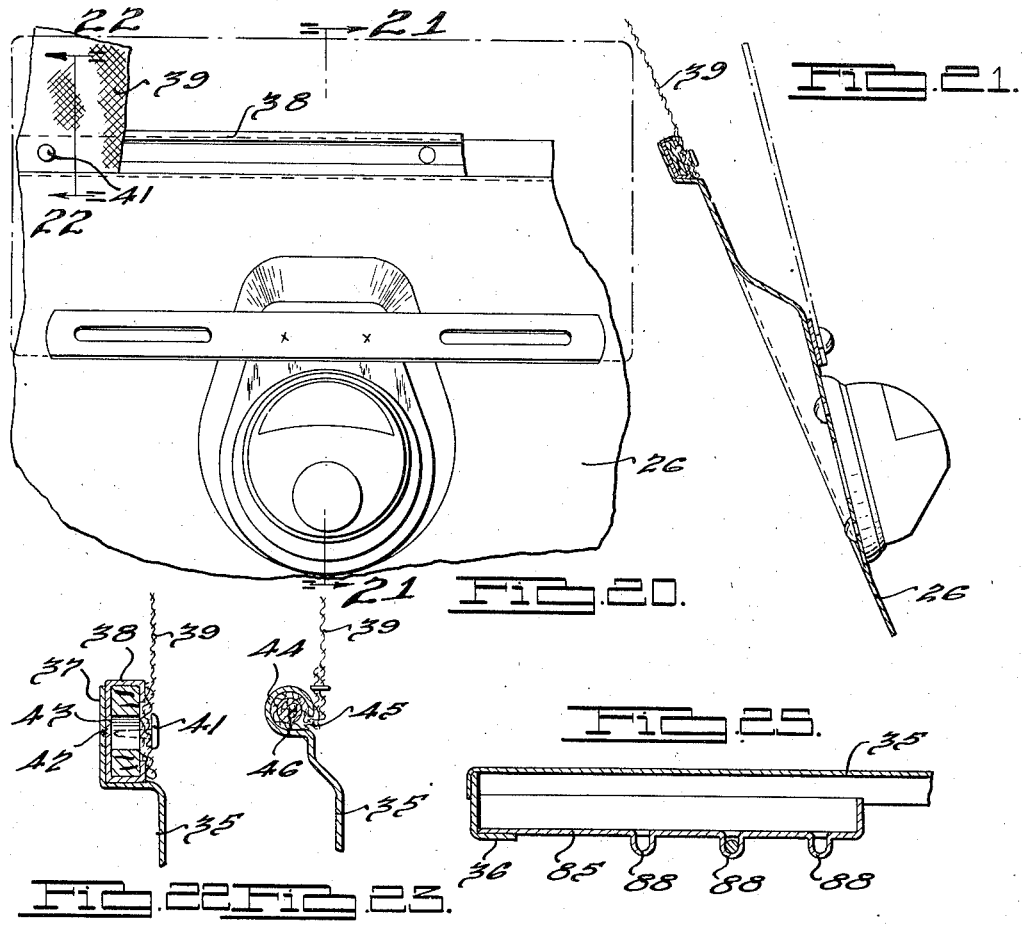
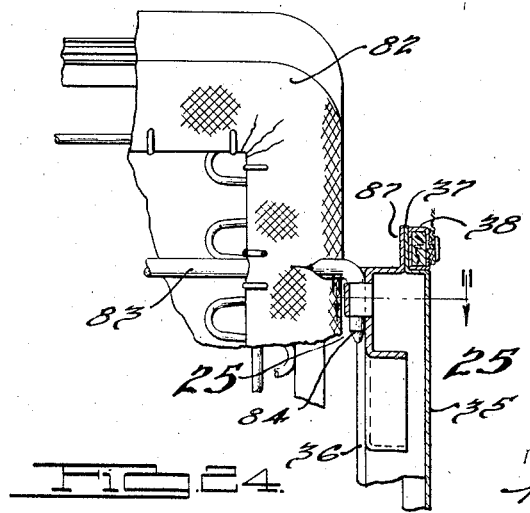
INVENTORS
Clarence W. Avery,
Charles H. Widman,
Noble C. Clark.
BY Harness, Dickey & Pierce
ATTORNEYS.

Patented Aug. 12, 1941

2,251,970

UNITED STATES PATENT OFFICE 2,251,970

VEHICLE BODY

Clarence W. Avery and Charles H. Widman, Detroit, and Noble C. Clark, Pleasant Ridge, Mich., assignors to The Murray Corporation of America, Detroit, Mich., a corporation of Delaware Application August 1, 1938, Serial No. 222,413

8 Claims. (Cl. 296—28)

This invention relates to vehicle bodies, and particularly to a vehicle body constructed from metal panels formed to the shape of the body parts and joined to form a single thickness body having portions reinforced.

It was the practice heretofore in the art to construct bodies from inner and outer panels which are joined together to provide a double wall body construction. The sections of panels were of various shapes and have become less in number as the art of metal working and metal improvement have advanced.

In practicing this invention, a body is constructed from a reduced number of panels which are preformed to desired shape and welded or otherwise secured together and to reinforcing elements. The side and rear panel is of single thickness and has an outwardly presented channel element welded directly thereto along the bottom forming a box section sill construction therewith. The floor panel is a metal stamping cooperating with the sill, having a kick-up portion therein rearwardly of the seat and a unit wheel housing centrally of the rear panel portion. A downwardly presented channel element may be employed transverse of the floor panel and joined to the rear door pillars, or, as pointed out hereinabove, the floor panel may be provided with a kick-up to provide clearance for the supporting chassis frame elements. The pillar reinforcing element of angle shape has a flange outwardly presented which rests upon the reinforcing channel element and is welded or otherwise secured thereto and to the adjacent sill portion.

Out-riggers are provided on the chassis frame extending laterally thereof to engage the sill portion of the body which is bolted thereto. The rear deck portion of the body has an embossed portion on which the license plate bar is welded or otherwise secured and on which the tail light of the body may be mounted. Corner reinforcing elements are provided for the rear side panels where they are joined to the pillar reinforcing elements, which elements are provided with vertically disposed openings which are spaced apart and employed for positioning the back cushion in various positions of adjustment.

Accordingly, the main objects of our invention are, to provide side and rear panels for a vehicle body formed of a single stamping; to join the side and rear panels of a vehicle body to an outwardly presented channel element to form a box section sill therewith; to provide a chassis frame narrower than the sill with laterally disposed arms or out-riggers, on the ends of which the sill rests and is bolted or otherwise secured; to provide a floor panel for the body which is welded or otherwise secured directly to the unit sill and side panel structure; to provide a wheel housing for the rear wheels in the central rear portion of the floor panel; to mount reinforcing plates between the rear pillar reinforcing elements and the side panels to provide strength thereto; to provide a number of apertures in the reinforcing plates for securing the back cushion in one of a plurality of adjustable positions; to emboss the rear deck portion of the body and weld or otherwise secure the license plate cross bar thereto; and in general, to provide a rear end and floor construction for a vehicle body which forms with the front end construction a rigid unit body, simple in construction and economical of manufacture.

Other objects and features of novelty of the invention will be either specifically pointed out or will become apparent when referring, for a better understanding of the invention to the following description taken in conjunction with the accompanying drawings, wherein:

Figure 1 is a side view, in elevation, of a vehicle having a passenger body thereon embodying features of this invention;

Fig. 2 is a front view of the structure illustrated in Fig. 1;

Fig. 3 is a side view, in elevation, of a vehicle, similar to that illustrated in Fig. 1, having a body of the commercial type thereon;

Fig. 4 is an enlarged broken top view of the structure illustrated in Fig. 1;

Fig. 5 is a sectional view of the structure illustrated in Fig. 4, taken on the line 5—5 thereof;

Fig. 6 is a sectional view of the structure illustrated in Fig. 5, taken on the line 6—6 thereof;

Fig. 7 is a broken sectional view of the structure illustrated in Fig. 6, taken on the line 7—7 thereof;

Fig. 8 is a broken sectional view of the structure illustrated in Fig. 6, taken on the line 8—8 thereof;

Fig. 9 is an enlarged sectional view of the structure illustrated in Fig. 6, taken on the line 9—9 thereof;

Fig. 10 is an enlarged sectional view of the structure illustrated in Fig. 6, taken on the line 10—10 thereof;

Fig. 11 is an enlarged sectional view of the structure illustrated in Fig. 6, taken on the line 11—11 thereof;

Fig. 12 is a broken sectional view in perspective, of the junction of the pillar reinforcing element, rear side panel, sill, floor, and the cross brace;

Fig. 13 is a sectional view of the structure illustrated in Fig. 9, taken on the line 13—13, thereof;

Fig. 14 is a sectional view of the structure illustrated in Fig. 13, taken on the line 14—14 thereof;

Fig. 15 is a sectional view of the structure illustrated in Fig. 13, taken on the line 15—15 thereof;

Fig. 16 is an enlarged broken view, similar to that illustrated in Fig. 6, showing a modified form thereof;

Fig. 17 is a sectional view of the structure illustrated in Fig. 16, taken on the line 17—17 thereof;

Fig. 18 is a sectional view of the structure illustrated in Fig. 16, taken on the line 18—18 thereof;

Fig. 19 is a sectional view of the structure illustrated in Fig. 16, taken on the line 19—19 thereof;

Fig. 20 is an enlarged broken view of the central rear deck and top portion of the vehicle body illustrated in Fig. 1;

Fig. 21 is a sectional view of the structure illustrated in Fig. 20, taken on the line 21—21 thereof;

Fig. 22 is an enlarged sectional view of the structure illustrated in Fig. 20, taken on the line 22—22 thereof;

Fig. 23 is a view, similar to that illustrated in Fig. 22, showing a modified form thereof;

Fig. 24 is an enlarged broken view of the back cushion and the fastening means therefor located on the side of the body; and Fig. 25 is a sectional view of the structure illustrated in Fig. 24, taken on the line 25—25 thereof;

In Fig. 1, a vehicle having a body of the coupe type is illustrated, comprising side cowl panels 25, a rear panel 26, sill structure 27, doors 28, a fabric top 29, a hood 30 and front fenders 31. The front fenders and side cowl panels are interconnected at the front by an apron 32. Head lamps 34 are secured to the front inwardly sloping side panels 25 resting in sockets formed therein. The front end construction of the body has been illustrated, described, and claimed in detail in our co-pending application, Serial Number 222,412, filed August 1, 1938, and assigned to the assignee of the present invention. Similarly the construction of the door 28 is described in the co-pending application of Noble C. Clark, et al., Serial Number 219,564, filed July 16, 1938, and assigned to the assignee of the present invention.

The present invention pertains particularly to the rear end sill and floor construction alone or in combination with the doors and cowl construction described more fully in the above mentioned co-pending applications. The rear panel 26 is preferably made of three pieces, although it may be a unit stamping embodying the side rear panel portions 35 which join with the pillar reinforcing elements 36 to form the rear door jambs at the door openings. The top of the panel 26 is flanged inwardly and upwardly at 37, as illustrated in Fig. 22, forming a ledge for receiving the tacking strip 38 which is welded or otherwise secured thereto. The fabric 39 of the top 29 is provided with a hem at its lower end through which tacks 41 are driven into the tacking strip 38. At the points 42, where the welding between the tacking strip and flange 37 occurs, an aperture 43 in the tacking material may be provided to prevent the burning of the material during the welding operation and to facilitate the direct spot welding of the web of the tacking strip to the panel.

In Fig. 23, the top edge 44 of the side panel portions 35 is illustrated as being flanged inwardly and rolled to provide a channel having an opening 45 at its outer side. The end of the fabric 39 is hemmed about a flexible welt 46 which is slid through the channel with the fabric material extending out through the opening 45. In this construction the tacking strip and the labor required for tacking is eliminated.

The side rear panel portions 35 and the rear deck portion have a unit outwardly presented channel element 47 welded directly to the inner surfaces thereof through the laterally projecting flanges 48 as illustrated in Figs. 5 and 8. The channel element 47 forms a sill of box section structure with the rear panel 26. The sill panel 27 is flanged over the projecting flanges 48 of the sill and secured thereto by crimping, as illustrated in Figs. 10 and 11, which crimped portion may be welded to the channel element 47.

A floor panel 51 is provided in the bottom of the body resting on the channel element 47. The rear end of the floor panel rests upon the top of the sill or channel element 47 as illustrated in Fig. 11. At approximately the center of the door openings, at 53, the floor panel is deflected downwardly and joined to the vertically disposed web of the channel element 47, as illustrated in Fig. 10. The central forward portion 54 of the floor panel 51 is arcuately formed into the shape of a tunnel to provide clearance for the propeller shaft housing.

The chassis frame embodies side members 55 centrally disposed relative to the body having a cross member 56 thereon near the front of the body upon which the channel element 47 forming the sill of the body rests and is secured, preferably, by bolts. The rear door pillars of the chassis frame are interconnected by a downwardly presented reinforcing channel element 57 which is secured to the floor panel and forms a unit portion of the body. Bolts 58 connect the element 57 to rear ends of the chassis frame 55.

The connection between the channel element 57, sill element 47, reinforcing pillar elements 36, and rear side portion 35 is illustrated in perspective in Fig. 12. It will be noted that the channel element 57 has laterally disposed flanges 59 which rest upon the floor panel and are welded or otherwise secured directly thereto. The reinforcing pillar element 36 has an outwardly struck flange 61 which rests upon the web of the channel element 57 and is welded or otherwise secured thereto. The adjacent downwardly directed flange 62 of the element 36 is welded to the front flange of the channel element 57. The front ends of the side panel portion 35 are flanged over the reinforcing pillar elements 36 and when welded to the face thereof, form the rear door jambs as illustrated in Fig. 12.

Rearwardly of the reinforcing channel element 57 a wheel housing 63 is provided in which both rear wheels of the automobile which are disposed closely adjacent to each other, are housed. Laterally of the wheel housing 63 a wheel well 64 is provided in which the tire or the spare wheel 60 is mounted. Centrally of the well, a bar 65 is provided, welded to side panel portion 35 and forming a support for the wheel, the tire of which rests in the well 64. A stud 66 projects from the bar 65, as illustrated in Figs. 14 and 15, over which the hub cap 67 of the wheel extends, to be retained in position by a thumb screw 68.

Referring more specifically to Figs. 16 to 19, inclusive, we have illustrated a modified form of floor and chassis frame construction, which provides greater clearance forwardly of the rear pillars providing more leg room for the occupants. The floor panel 71 has the kick-up 72, as illustrated in Fig. 5, omitted, the chassis frame likewise being formed substantially straight. A cross brace 73 extends across the chassis frame near the rear end having the ends thereof deflected downwardly and extended below the channel sill portion 47 which rests thereon and is secured thereto by bolts 74. U-shaped bolts 75 are disposed about the cross element 73 for supporting the leaf spring 76 which extend rearwardly from the chassis frame to engage and support the rear axle housing. The floor panel 71 is flanged at 77 at the central portion to clear the cross elements 73, as illustrated in Fig. 19. The arcuate raised portion 77 of the floor panel 71 has the front edge 78 disposed vertically, aligned with the pillar reinforcing elements 36 to which it is connected by gusset plates 79 which are welded thereacross, to strengthen the pillar at this point.

A seat cushion 81 which rests directly on the floor has its rear edge terminating between the rear pillars while the back cushion 82 is aligned at its lower edge with said pillars. The back cushion 82 is of a form illustrated, described and claimed in the co-pending application of F. M. Shanahan, Serial Number 222,007, filed July 29, 1938, and assigned to the assignee of the present invention. The back cushion has a cross bar 83 disposed thereacross near the top edge, having the ends deflected downwardly at 84 in spaced relation to the back cushion. At the top of the pillar reinforcing elements 36, gusset plates 85 are provided having an offset flange 87 which is welded to the flange 37 at the top of the side panel portions 35. The gusset plates 85 have embossed portions 88 which are open at both ends and which provide eyes in which the ends 84 of the cross bar 83 may be disposed. The eyes position the seat back and provide adjustment to regulate the tilt of the back relative to the seat.

The top construction of the body illustrated in Fig. 1 comprises pivoted bows 90 to which the top material 39 is secured in the hereinabove set forth manner. With the lower edge of the top secured to the top edge of the side and rear panels 26 and with the front edge of the top material secured to the top front edge of the windshield, the bows 90 become fixed and the top becomes a permanent part of the body. It is to be understood that the front end of the top may be removably secured to the top of the windshield frame so that it may be lowered when desired.

A commercial type body may be constructed, as illustrated in Fig. 3, by providing a box body 92 rearwardly of the door pillar in the manner the side and deck panels 26 were formed on the vehicle illustrated in Fig. 1. In this arrangement bows may be provided transversely across the box body 92 over which the trim material 93 is stretched and secured in a manner above set forth. The pillars, sill and seat supporting structure is similar to that hereinabove described relative to the structure illustrated in Fig. 1.

While we have described and illustrated several embodiments of our invention, it will be apparent to those skilled in the art that various changes, omissions, additions and substitutions may be made therein without departing from the spirit and scope of our invention, as set forth in the accompanying claims.

What is claimed is:

1. A vehicle body having, in combination, rear panels forming the sides and deck portion, a U-shaped element of channel section which is outwardly directed and secured to the inner face of said panels forming a box section sill structure therewith, and a longitudinally disposed chassis frame having outwardly extending arms upon which the sill rests and is bolted or otherwise secured thereto.

2. A vehicle body having, in combination, rear panels forming the sides and deck portion, a U-shaped element of channel section which is outwardly directed and secured to the inner face of said panels forming a box section sill structure therewith, and angle shaped reinforcing pillar elements about which the front ends of the side panels are flanged and welded or otherwise secured.

3. A vehicle body having, in combination, rear panels forming the sides and deck portion, an outwardly directed channel element secured to the inner face of said panels forming a box section sill structure therewith, a floor panel resting on said sill, a reinforcing element extending laterally of said floor panel adjacent the front terminal edge of the side panels, and pillar members secured to said reinforcing element, the side terminal edge of the side panels is flanged and secured to said pillar members.

4. A vehicle body having, in combination, rear panels forming the sides and deck portion, an outwardly directed channel element secured to the inner face of said panels forming a box section sill structure therewith, a floor panel resting on said sill, a reinforcing element extending laterally of said floor panel adjacent the front terminal edge of the side panels, pillar members secured to said reinforcing element, the side terminal edge of the side panels is flanged and secured to said pillar members, and gusset plates interconnecting the top portion of said pillar members and the top edge of said side panel portions.

5. A vehicle body having, in combination, rear panels forming the sides and deck portion, an outwardly directed channel element secured to the inner face of said panels forming a box section sill structure therewith, a floor panel resting on said sill, a reinforcing element extending laterally of said floor panel adjacent the front terminal edge of the side panels, pillar members secured to said reinforcing element, the side terminal edge of the side panels is flanged and secured to said pillar members, gusset plates interconnecting the top portion of said pillar members and the top edge of said side panel portions, said gusset plates having vertically disposed eyes, and a back cushion having hooks which engage said eyes to position the back cushion within the body.

6. In a vehicle body, sides and rear deck panel having a rolled top edge with the edge of the roll portion spaced from the panel portion and substantially in extension thereof, a top for said body of fabric material, the end of said material having a welt thereon which may be anchored in said annular portion with the material extending through the slot thereof.

7. In a vehicle body, the combination with the sides and rear deck panel, the top edge of said panel being formed to provide a slotted tube with the free edge substantially aligned with said panel, a top for said body of fabric material, and an enlarged edge on said material disposed in said tubular element with the material extending from the slot thereof.

8. In a vehicle body, the combination of side panels and a deck panel, means at the top edge of said panels to which top material may be secured, pillar reinforcing elements mounted adjacent to the front ends of the side panels which are secured thereto, gusset plates joining the top edges of the side panels to the reinforcing elements and providing top supporting means, and a top supported on the joined portions of the gusset plates and side panels having the fabric material attached to said securing means.

CLARENCE W. AVERY.
CHARLES H. WIDMAN.
NOBLE C. CLARK.